(12) United States Patent
Johnson (10) Patent No.: US 11,167,679 B2
(45) Date of Patent: Nov. 9, 2021

(54) TRAILER WITH QUICK ATTACH FOR SKIDSTEER

(71) Applicant: Robert Johnson, Leslieville (CA)

(72) Inventor: Robert Johnson, Leslieville (CA)

(*) Notice: Subject to any disclaimer, the term of this patent is extended or adjusted under 35 U.S.C. 154(b) by 0 days.

(21) Appl. No.: 16/006,635

(22) Filed: Jun. 12, 2018

(65) Prior Publication Data

US 2018/0354401 A1 Dec. 13, 2018

(30) Foreign Application Priority Data

Jun. 12, 2017 (CA) ...................... 2970265

(51) Int. Cl.
*B60P 3/06* (2006.01)
*B60P 1/43* (2006.01)

(52) U.S. Cl.
CPC ............. *B60P 3/062* (2013.01); *B60P 1/433* (2013.01); *B60P 1/435* (2013.01); *B60P 3/064* (2013.01)

(58) Field of Classification Search
CPC .......... B60P 3/075; B60P 3/073; B60P 3/079; B60P 3/077; B60P 3/07; B60P 3/122; B60P 7/0807; B60P 3/08
USPC ........ 410/3, 7, 23, 19, 30, 97, 120, 96, 9, 8, 410/67, 46; 414/480, 462, 477, 484, 563, 414/788.3; 280/33.991, 656, 412, 204, 280/400, 748, 93.51
See application file for complete search history.

(56) References Cited

U.S. PATENT DOCUMENTS

| | | | | |
|---|---|---|---|---|
| 3,672,521 A * | 6/1972 | Bauer | ................... | E02F 3/3672 414/723 |
| 3,984,016 A * | 10/1976 | Kuhn | ...................... | E02F 3/364 414/686 |
| 4,044,692 A * | 8/1977 | Cruthis | ................... | B60P 3/073 410/19 |
| 6,113,326 A * | 9/2000 | Nicholson | ............... | B60P 3/062 410/19 |
| 6,659,497 B1* | 12/2003 | Owens | ..................... | A22B 5/06 280/415.1 |
| 7,334,972 B2* | 2/2008 | Cash | ....................... | B60P 3/064 410/100 |
| 7,909,355 B2* | 3/2011 | Thedford | ............. | B62D 63/061 280/656 |
| 2012/0183369 A1* | 7/2012 | Landoll | .................... | B60P 3/07 410/3 |
| 2013/0323006 A1* | 12/2013 | Smithson | ................ | B60P 3/062 414/812 |

(Continued)

Primary Examiner — D Glenn Dayoan
Assistant Examiner — Sunsurraye Westbrook
(74) Attorney, Agent, or Firm — Sander R. Gelsing (57) ABSTRACT

In one aspect there is provided a trailer having a front end, a rear end and a loading deck for carrying a skidsteer having an implement connector frame. The trailer further comprising a carrier operable to receive the skidsteer's implement connector frame. In a system aspect, there is provided trailer and skidsteer system. The trailer has a front end, a rear end and a loading deck for carrying a skidsteer thereon. The skidsteer has an implement connector frame. The system comprises a carrier operable to receive the skidsteer's implement connector frame and securing means to secure the implement connector to the carrier member. When the implement connector is secured to the carrier member, using the securing means, the skidsteer is placed in a secured transport position on the loading deck.

9 Claims, 9 Drawing Sheets

(56) References Cited

U.S. PATENT DOCUMENTS

2014/0271017 A1\* 9/2014 Watson ................ B60P 3/073
 410/3
2016/0096566 A1\* 4/2016 McElhiney ........... B62D 59/04
 280/656

\* cited by examiner

TRAILER WITH QUICK ATTACH FOR SKIDSTEER

FIELD OF THE INVENTION

This invention relates generally to securing skidsteers. More particularly, the invention relates to a trailer with means for securing a skidsteer thereon.

BACKGROUND OF THE INVENTION

The background information discussed below is presented to better illustrate the novelty and usefulness of the present invention. This background information is not admitted prior art.

A multi terrain loader, skid loader, skid-steer loader, or skidsteer, is a small, rigid-frame, engine-powered machine with lift or loader arms used to attach a wide variety of labor-saving tools or attachments. Skidsteer loaders typically have wheels, while multi terrain loaders have tracks. One type of skid-steer loader is disclosed in Melroe et al. U.S. Pat. No. 3,231,117. As used herein, the term skidsteer will refer to all engine-powered machines with lift arms, including multi terrain loaders, skid loaders, skid-steer loaders and skidsteers.

One thing that these machines typically all have in common is that typically they feature a universal quick attachment coupler system which allows for fast, secure work tool or implement changes. Such a system allows for the conventional bucket of many skid loaders to be quickly replaced with a variety of specialized buckets or implements, such as hydraulic breakers, pallet forks, angle brooms, sweepers, augers, mowers, snow blowers, stump grinders, tree spades, trenchers, dumping hoppers, rippers, tillers, grapples, snow blades and wood chipper machines.

One example of such a quick attachment coupler system is disclosed in Bauer, et al. U.S. Pat. No. 3,672,521. That system provides a joint which distributes the operational stresses throughout substantially the entire distance between the loader arms, and minimizes point concentration of stresses. It includes a wedging action which insures that the connection between the adapter device and the implement will remain tight in spite of wear and distortion which may occur during operation. Another example is disclosed in Kuhn, U.S. Pat. No. 3,984,016. Typically, in all cases of such skidsteer quick attachment coupler systems, there will be an implement connector frame at the end of the lift arms of the skidsteer, a carrier provided on the implement or attachment (to receive the connector frame), and locking means to securely lock the connector frame to the carrier. Typically the locking means are a pair of pins that actuate from the connector frame into corresponding holes provided in the carrier.

Skidsteers are often transported to and from worksites using a flatbed trailer. A variety of tensile members, such as ratchet straps, chains and boomers, are normally employed to secure a skidsteer onto a trailer. Often the skidsteer is tied down at four corners, two at the front of the skidsteer and two at the rear. However, it is very time consuming to strap-in and unstrap a skidsteer, every time the skidsteer is loaded or unloaded from a trailer. Therefore, what is needed is an apparatus or system that reduced or eliminates the need for such tensile members.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF THE PREFERRED EMBODIMENTS

The following description is of preferred embodiments by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

A first embodiment of the trailer 10 of the present invention is shown in FIGS. 1-13 and is designed to support a skidsteer 20 thereon. The skidsteer 20 further comprises a conventional implement connector frame 22 mounted at the end of the skidsteer's lift arms 20*a*. The implement connector frame 22 preferably comprises a wedge shaped end 22*w*. The trailer 10 preferably comprises a front end 10*f*, a rear end 10*r*, a loading deck 12 between the front end 10*f* and rear end 10*r*, at least one loading ramp 14, wheels and axel(s) 10*w* and a carrier member 30.

The loading deck 12 is suitable to support at least one skidsteer 20 thereon, and the one or more loading ramps 14 are suitable to allow a skidsteer 20 to drive onto, and off of, the loading deck 12 from the ground surface or road way upon which the trailer 10 might be placed. Preferably, the various components of the invention, such as the trailer's front end 10*f*, the implement connector frame 22 and the carrier 30, are made of metal, steel or any other suitable material that provides adequate strength, durability and rigidity to support the various loads that may be encountered when storing, loading and transporting a skidsteer on the trailer 10.

Preferably, the trailer 10 is provided with a fifth wheel hitch assembly 10h on the front end 10f. More preferably, the trailer's wheels and axels 10w are positioned at the rear end 10r. Even more preferably, the loading deck 12 is positioned between the rear end 10r and the fifth wheel hitch assembly 10h at the front end 10f, and is carried as low to the ground as possible. Advantageously, when a skidsteer 20 is loaded on the loading deck 12, the center of gravity of the skidsteer 20 is kept lower (as compared to if the loading deck 12 was positioned over the wheels and axels 10w). More advantageously, when a skidsteer 20 is loaded onto, or off of, the loading deck 12, the skidsteer 20 does not have to drive up as high (as compared to if the loading deck was positioned over the wheels and axel(s) 10w), thereby providing increased safety and lower drop height, should the skidsteer be accidentally driven off of the loading deck 12, or should one of the skidsteer's wheels slip off of the deck 12.

Preferably, the loading ramps 14 are provided on the one or more lateral sides 10s of the trailer, between the front 10f and rear 10r ends. Advantageously, a skidsteer 20 may be side-loaded and unloaded onto, and off of, the trailer 10 from either side 10s. More preferably, the loading ramps 14 are pivotally connected to the trailer 10 at a pivot point 14p with the loading deck 12 in a conventional manner (see FIG. 3). Advantageously, the one or more ramps 14 may be pivoted downwards into an angled arrangement, when the trailer 10 is in a loading configuration to load or unload the skidsteer 20 (e.g. see FIGS. 1-4), and the ramps 14 may be pivoted upwards in an upright arrangement when the trailer 10 and skidsteer 20 are in a secure, transport configuration (e.g. see FIGS. 5-7).

In another embodiment of the trailer 10 (not shown), no loading ramps are provided and, instead, independent ramp means (such as wooden planks or separate metal loading ramps) may be provided as needed. In yet another embodiment of the trailer 10 (also not shown), the loading deck 12 may be sufficiently low to the ground (or may be adjustable in height) to allow a skidsteer to simply drive onto, and off of, the deck 12 without the need for loading ramps 14.

The carrier member 30 preferably has a first surface or face 30f which is operable to receive the implement connector frame 22 of the skidsteer 20. The carrier member 30 may receive implement connector frame 22 in a similar manner to how a carrier (which is part of a skidsteer implement might) receive a skidsteer's implement connector frame, i.e. in the same manner as a quick attachment system; e.g. as disclosed in Bauer, et al. U.S. Pat. No. 3,672,521 and in Kuhn, U.S. Pat. No. 3,984,016.

In the present invention, carrier 30 is securely mounted to the trailer 10 so that the first face 30f is positioned to receive the skidsteer's implement connector frame 22 when the skidsteer 20 is positioned in a transport configuration on the trailer's deck 12. Carrier 30 may be mounted to the trailer 10 using conventional means, such as via nuts and bolts or by means of welding, as long as the carrier 30 is mounted so as to withstand the various loads that may be encountered when storing, loading and transporting a skidsteer on the trailer 10. Preferably, the carrier 30 is mounted to the trailer 10 near the trailer's front end 14f, as shown. More preferably, the carrier 30 is mounted to structural components 10c of the trailer's front end (see FIG. 9). In another embodiment (not shown), the carrier 30 is mounted to structural components of the trailer 10 near the trailer's rear end 14r.

Preferably, the implement connector frame 22 further comprises a wedge-shaped top end 22w, and the carrier 30 further comprises an angled lip or ledge 30l along the top end of the first face 30f; the angled ledge 30l oriented so as to form a wedge shaped cavity 30w of suitable dimensions to receive the wedge shaped top end 22w therein when the implement connector frame 22 is secured to the carrier 30. As such, the wedge-shaped top end 22w and the wedge shaped cavity 30w, along with the skidsteer's lift arms 20a actuated to keep end 22w wedged inside cavity 30w, function as a securing means 35 to keep the skidsteer 20 placed in a secured, transport position.

Advantageously, the skidsteer 20 can secure or lock its implement connector frame 22 into the carrier 30 (in a conventional manner similar to how one might lock an implement connector frame into an carrier that is part of an implement) and, when so secured, the skidsteer 20 is in the secured, transport position on the trailer 10—i.e. the connector frame 22 of the skidsteer 20 is now securely fastened to the trailer via carrier 30.

More advantageously, ratchet straps, chains and boomers, are no longer required to secure the skidsteer 20 onto the trailer 10—since the skidsteer 20 is now secured to the trailer 10 via the implement connector frame 22 and carrier 30. Even more advantageously, a skidsteer 20 can be quickly placed in an unsecured, loading configuration, by simply disconnecting the connector frame 22 from the carrier 30. Since the connection between the skidsteer 20 and trailer 10 is now a quick attachment coupler system, the loading/ securing and unsecuring/unloading of a skidsteer 20 onto, and off of, a trailer 10 is now much quicker as compared when using conventional ratchet straps, chains and boomers.

This is particularly advantageous when a contractor uses the skidsteer 20 at multiple job sites in one day, has to load/unload the skidsteer 30 onto the trailer 10 between each job site, and where the job sites are located geographically close (e.g. snow removal from a dozen or more driveways at different client sites located only a few blocks from each other). The current trailer 10 with the carrier 30 will significantly reduce loading and unloading time in such a scenario, saving significantly time each day (perhaps up to several hours of time are saved).

Figure 1:
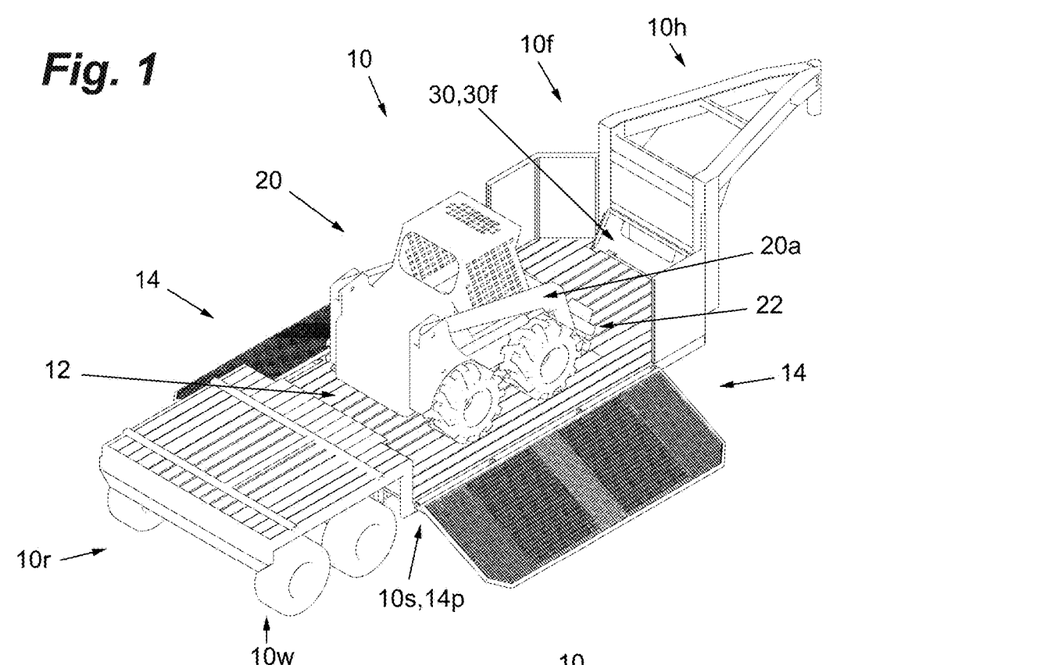
FIG. 1 is a perspective view of a skidsteer on one embodiment of the trailer of the present invention, shown in an unsecured, loading configuration on the trailer.
Figure 2:
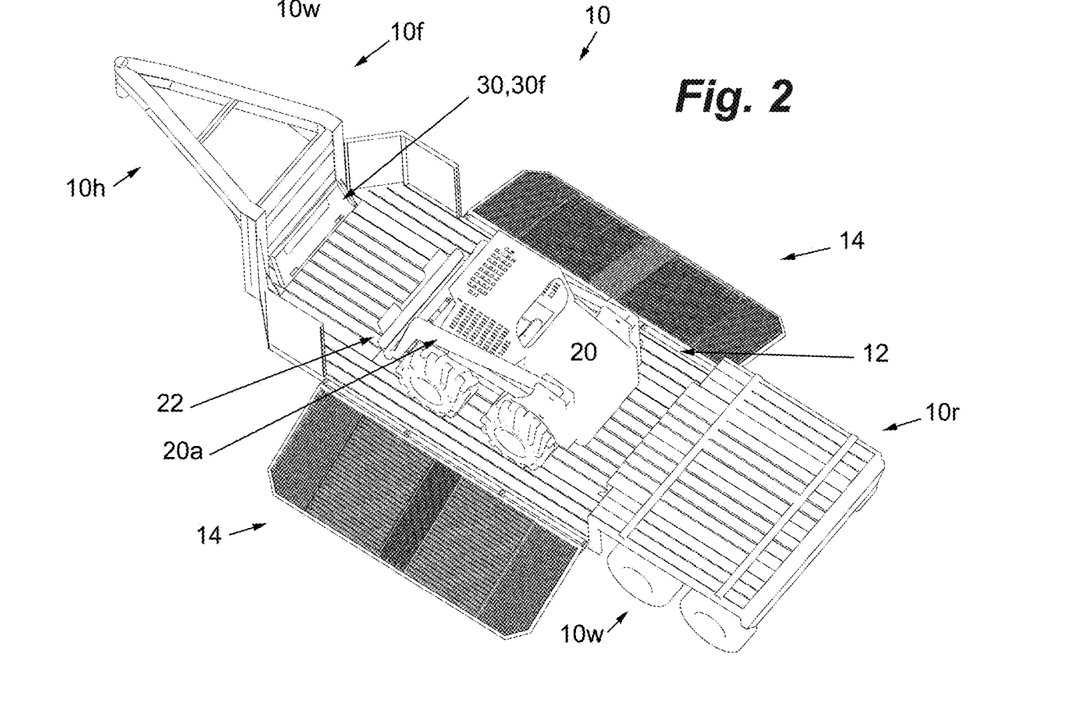
FIG. 2 is another perspective view of a skidsteer on the trailer of FIG. 1, shown in an unsecured, loading configuration on the trailer.
Figure 3:
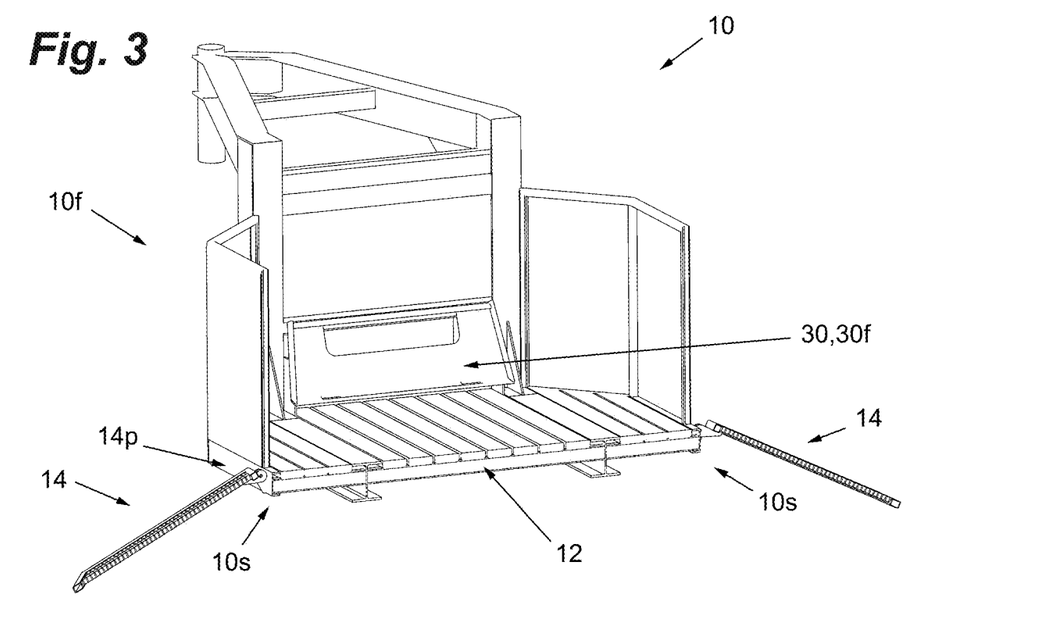
FIG. 3 is a sectioned perspective view of the front of the trailer of FIG. 1.
Figure 4:
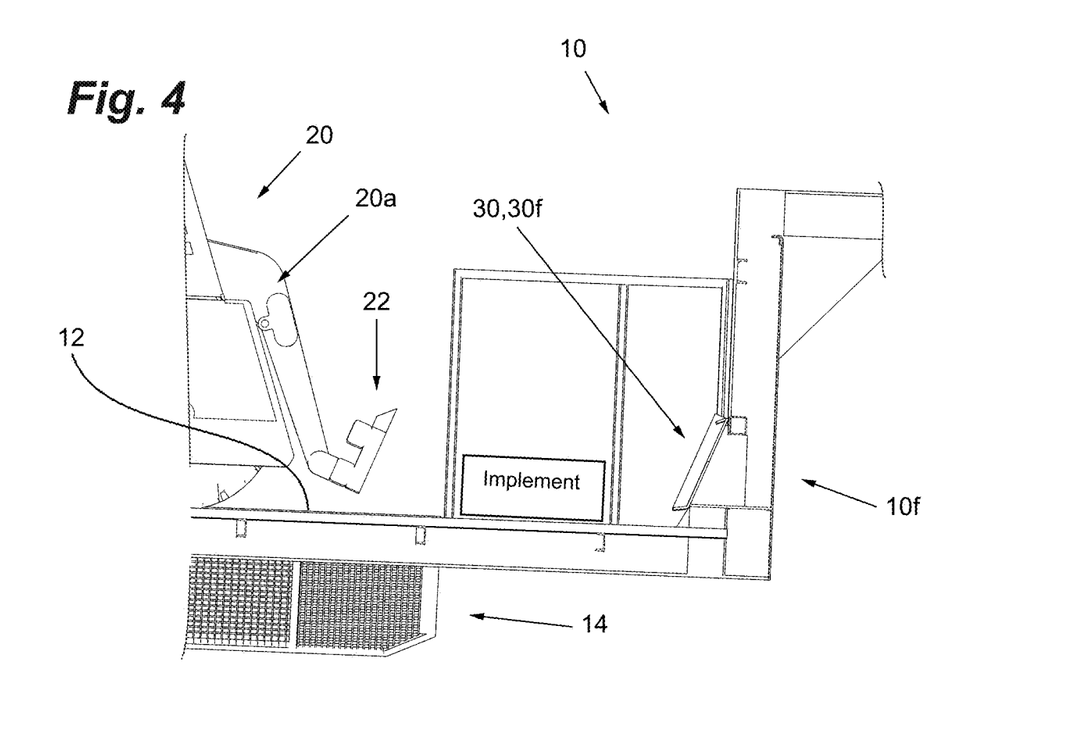
FIG. 4 is a side view of the front of the trailer of FIG. 1 showing a close up of an implement connector frame and an implement.
Figure 5:
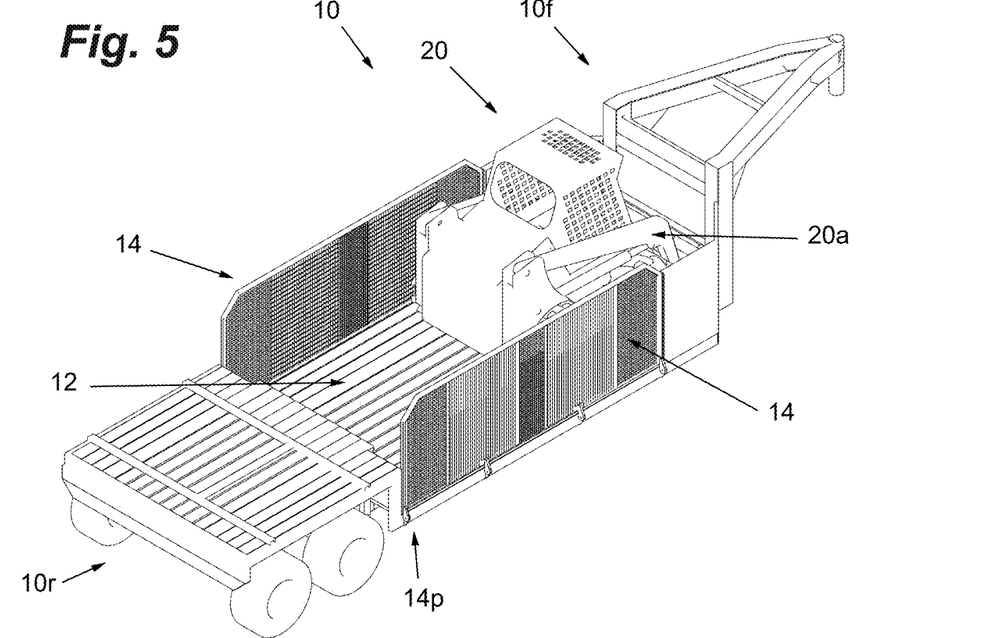
FIG. 5 is another perspective view of a skidsteer on the trailer of FIG. 1, now shown in a secured, transport configuration on the trailer.
Figure 6:
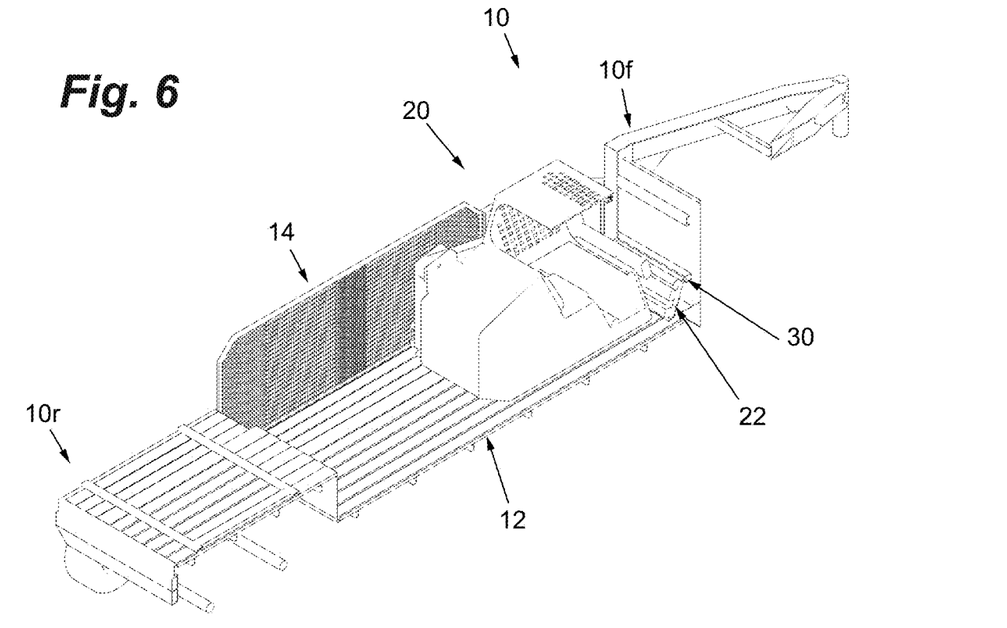
FIG. 6 is a sectioned perspective view of the skidsteer and trailer of FIG. 5, with the skidsteer shown in a secured, transport configuration on the trailer.
Figure 7:
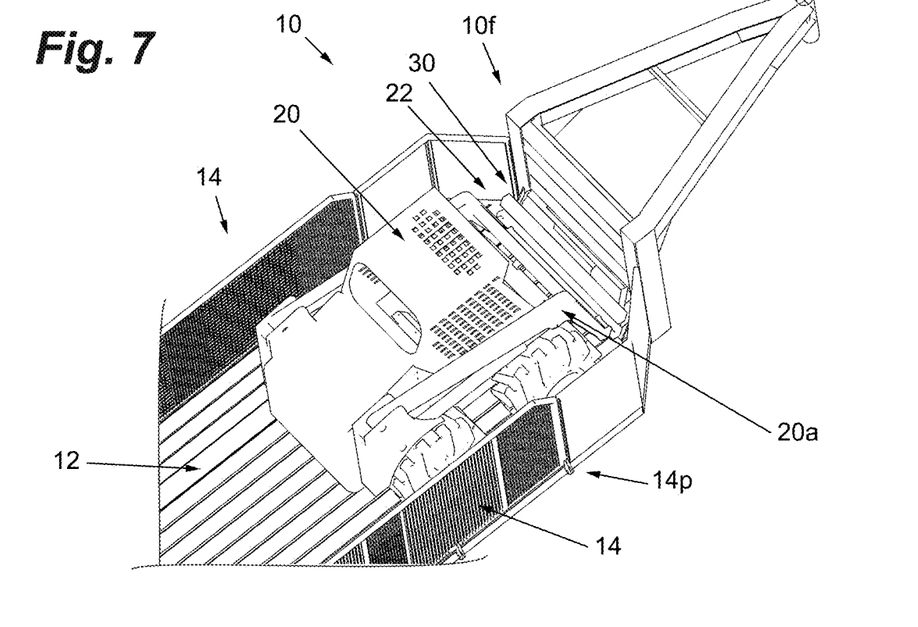
FIG. 7 is a another perspective view of the skidsteer and trailer of FIG. 5, with the skidsteer shown in a secured, transport configuration on the trailer.
Figure 8:
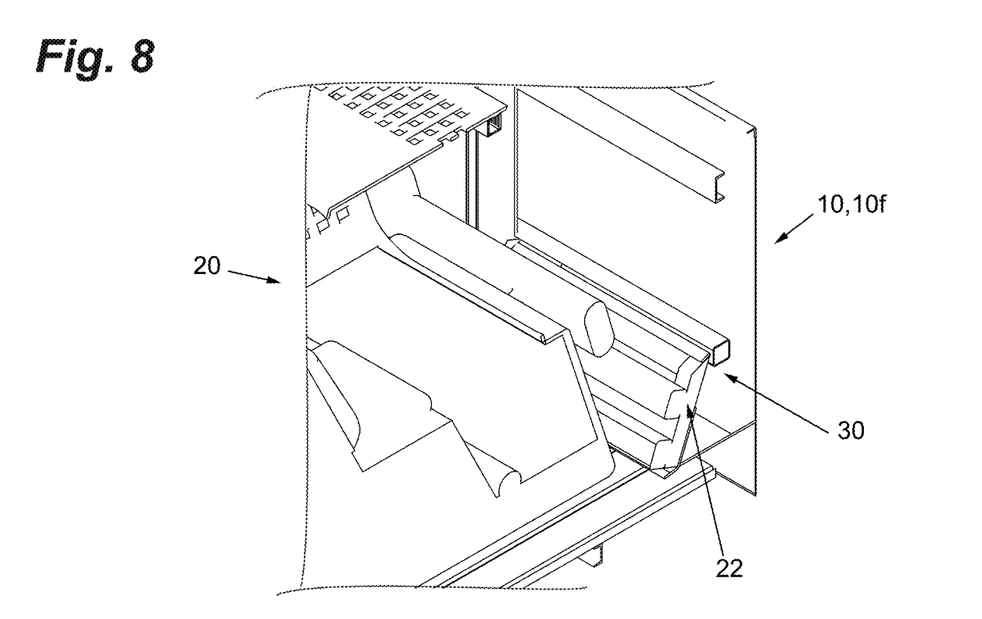
FIG. 8 is a close-up sectioned perspective view of the skidsteer and trailer of FIG. 5, with the skidsteer shown in a secured, transport configuration on the trailer.
Figure 9:
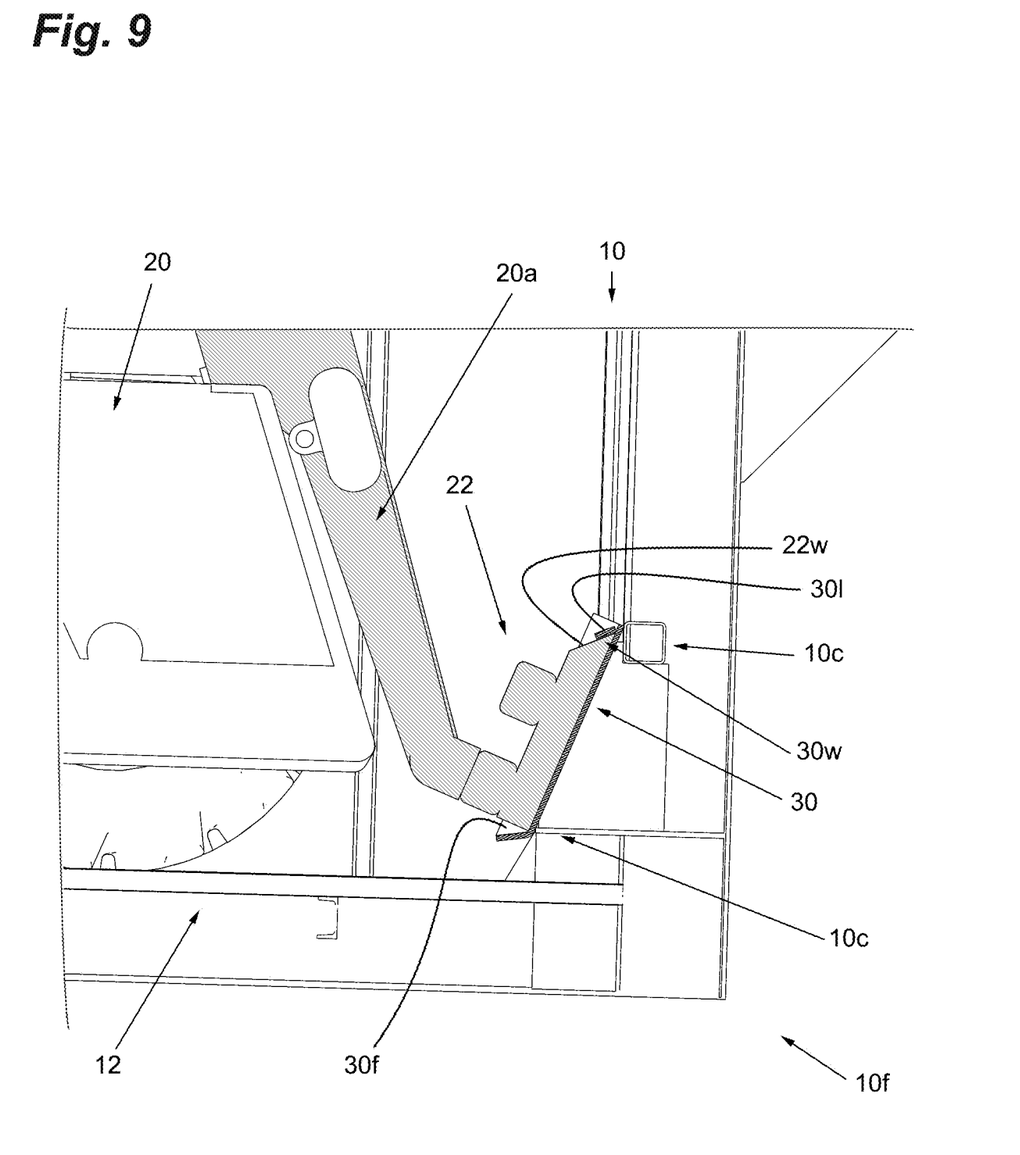
FIG. 9 is a close-up side view of the skidsteer and trailer of FIG. 5, with the skidsteer shown in a secured, transport configuration on the trailer.
Figure 10:
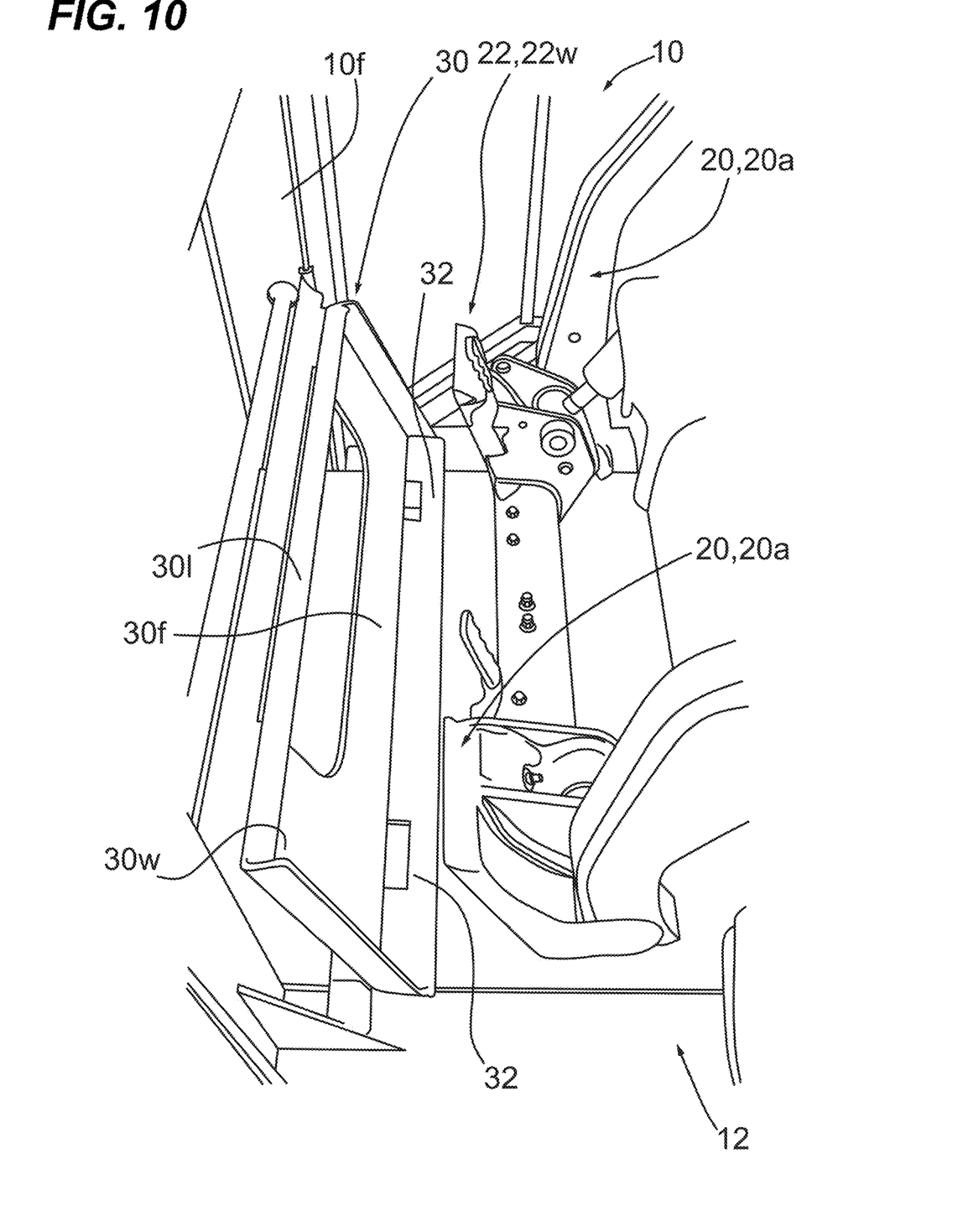
FIGS. 10-13 are close-up perspective views of a preferred embodiment of the implement connector frame, the carrier and the locking means.
Figure 11:
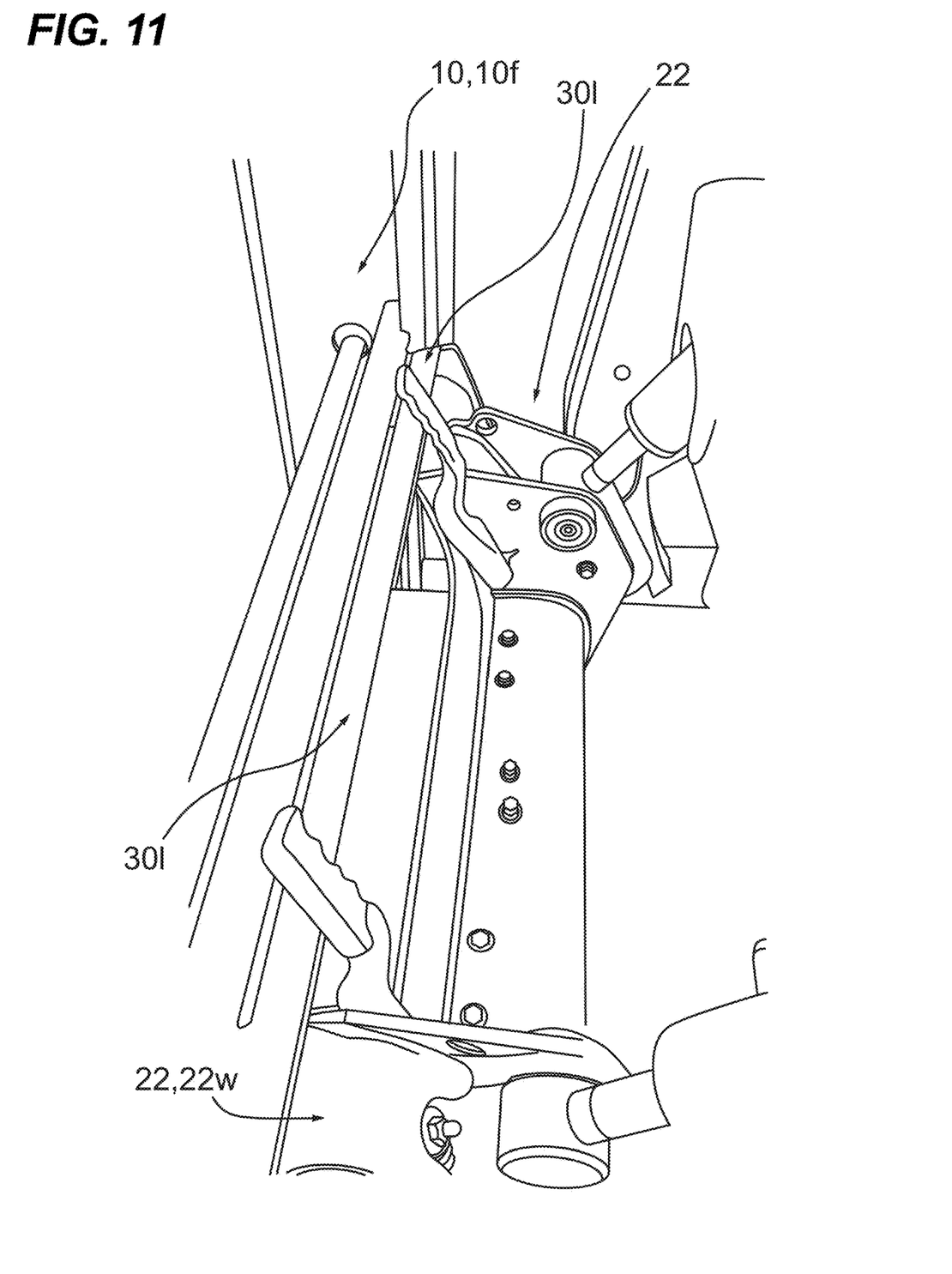
Figure 12:
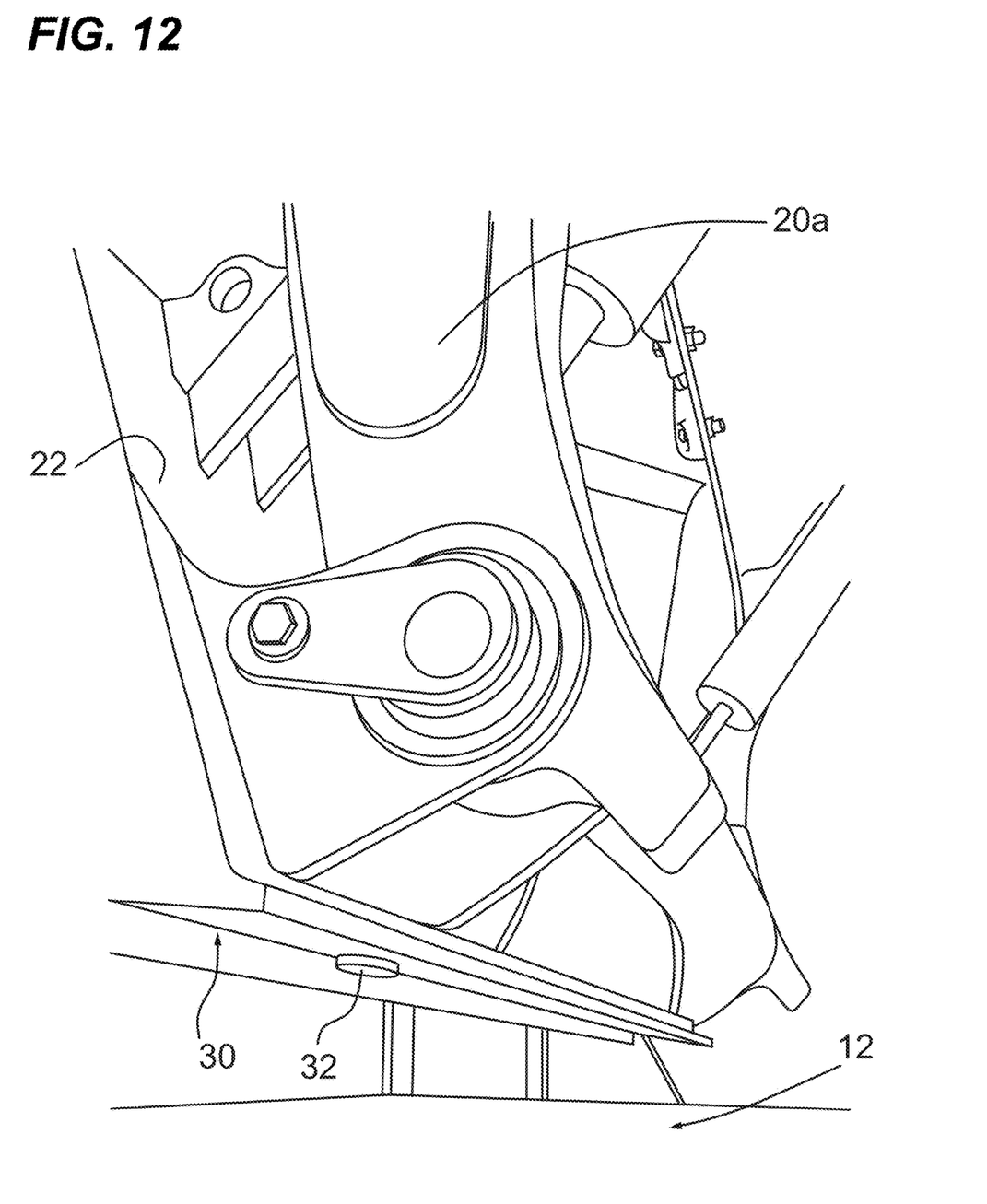
Figure 13:
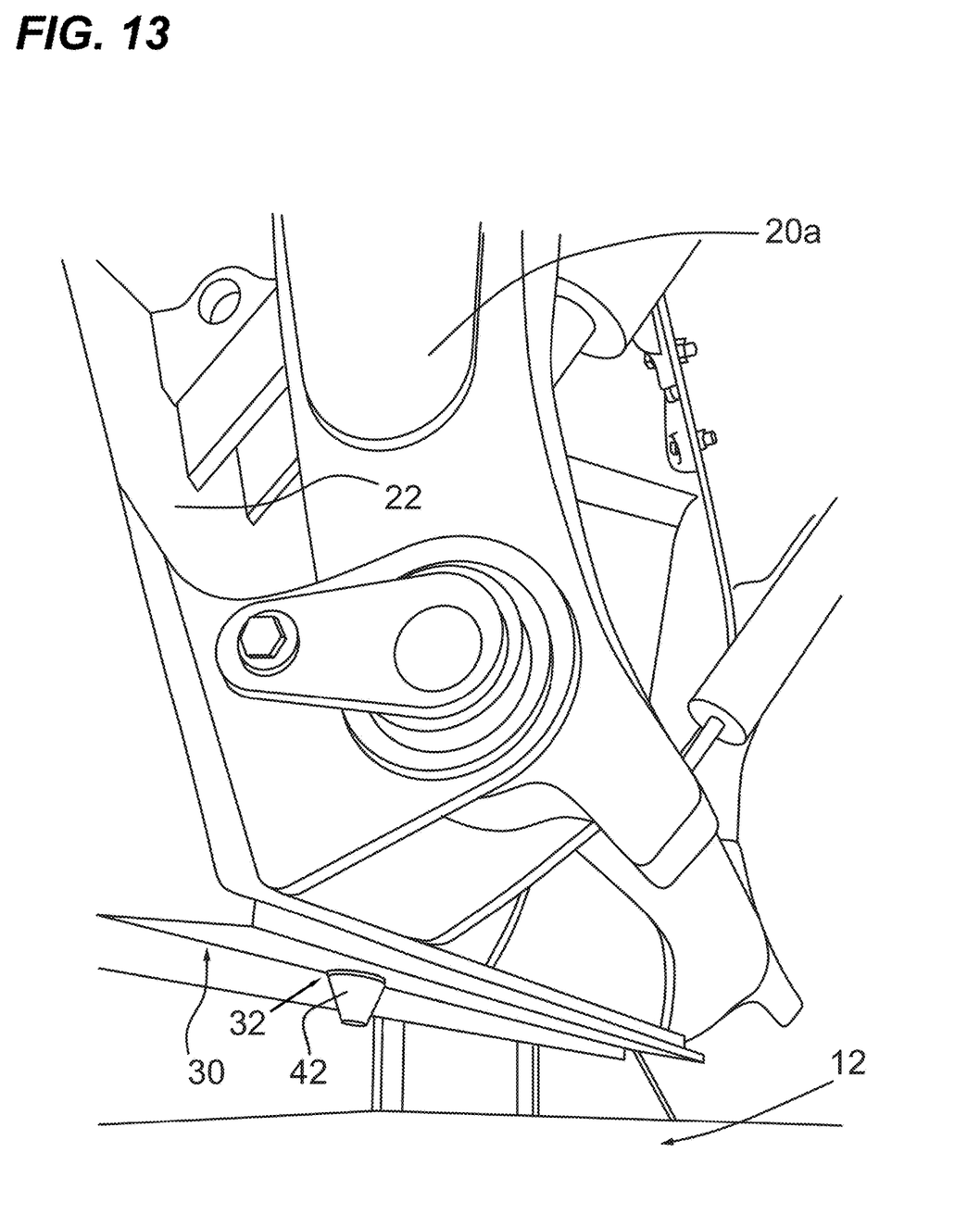

Preferably, the carrier 30 is mounted to the trailer's front end in a generally low position, i.e. relatively close to the deck 12; e.g. on the front end 10f and only a few inches (e.g. 2-6 inches) above the deck 12 (see FIG. 9). Advantageously, the skidsteer 20 can lock its implement connector frame 22 into the carrier 30 while also keeping the lift arms 20a in a generally downward orientation, thereby positioning the implement connector frame 22 close to the deck 12, so as to keep the overall center of gravity of the skidsteer 20 lower (as compared to if the carrier 30 was mounted high above the deck 12 and the lift arms had to lift the connector frame 22 high above the deck; although such an embodiment would also work, as long as a secure connection between connector frame 22 and carrier 30 could still be made).

Preferably, securing means 35 further comprises locking means 40 to further securely lock the connector frame 22 to the carrier 30. In one embodiment the locking means comprise at least one moveable locking pin 42 and at least one pin passage 32 in the carrier 30. Locking pin 42 is mounted on the connector frame 22 and actuates between a locked and unlocked position. Preferably, a handle 44 and linkage 45 are provided to facilitate actuation of the locking pin 42 between the locked and unlocked position (see FIGS. 10-13). Pin passage 32 is sized and dimensioned so as to receive locking pin 42 therethrough; see FIGS. 11-12.

Advantageously, locking means 40 further secures implement connector frame 22 to the carrier 30 when the skidsteer 20 is in the secured, transport position.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A trailer having a front end, a rear end and a loading deck for carrying a skidsteer having lift arms and an implement connector frame mounted to the end of said lift arms, the implement connector frame operable to connect to an implement, the trailer comprising:
   a carrier mounted on said trailer, said carrier operable to receive the skidsteer's implement connector frame;
   wherein the implement connector frame and the carrier provide a connection between the skidsteer and the trailer that is a quick attachment coupler system.

2. The trailer of claim 1 wherein the trailer further comprises structural components at the front end, and wherein the carrier is mounted to said structural components at the trailer's front end.

3. The trailer of claim 1 wherein the trailer further comprises structural components at the rear end, and wherein the carrier is mounted to said structural components at the trailer's front rear.

4. The trailer of claim 1 wherein the carrier further comprises:
   a first face having a top end;
   an angled lip along the top end;
   wherein the angled lip and first face form a wedge shaped cavity.

5. The trailer of claim 1 wherein the trailer further comprises a lateral side between the front end and the rear end, the trailer further comprising at least one loading ramp pivotally connected to said lateral side.

6. A trailer and skidsteer system, the trailer having a front end, a rear end and a loading deck for carrying a skidsteer, the skidsteer having lift arms and an implement connector frame mounted to the end of said lift arm, the implement connector frame operable to connect to an implement, the system further comprising:
   a carrier mounted on said trailer, said carrier operable to receive the skidsteer's implement connector frame,
   securing means to secure the implement connector to the carrier member,
   wherein the implement connector frame and the carrier provide a connection between the skidsteer and the trailer that is a quick attachment coupler system; and
   wherein, when the implement connector frame is secured to the carrier member, the skidsteer is placed in a secured transport position on the loading deck.

7. The trailer and skidsteer system of claim 6, the skidsteer further comprises lift arms and wherein the implement connector frame is mounted to said lift arms, wherein the securing means further comprises:
   the implement connector frame having a wedge-shaped top end;
   the carrier having a wedge shaped cavity;
   wherein said wedge shaped cavity can receive at least a portion of the wedge-shaped top end; and
   wherein, when the skidsteer is placed on the loading deck, the lift arms can be actuated to keep wedge-shaped top end positioned at least partially inside wedge shaped cavity, so as keep the skidsteer in a secured, transport position on the trailer.

8. The trailer of claim 1 wherein the carrier is mounted to the trailer in a position that is above the loading deck.

9. The trailer of claim 6 wherein the carrier is mounted to the trailer in a position that is above the loading deck.

\* \* \* \* \*